Nov. 6, 1962  J. H. FARRELL ETAL  3,062,402
LIQUID STORAGE TANK
Filed April 22, 1959  2 Sheets-Sheet 1

INVENTORS
James H. Farrell
James Peter Hunsaker
George Y. Robinson, Jr.
BY
Attorneys Nov. 6, 1962 J. H. FARRELL ETAL 3,062,402
LIQUID STORAGE TANK
Filed April 22, 1959 2 Sheets-Sheet 2

INVENTORS
James H. Farrell
James Peter Hunsaker
BY George Y. Robinson, Jr.

By Ooms, McDougall, Williams & Herch
Attorneys

United States Patent Office 3,062,402
Patented Nov. 6, 1962

3,062,402
LIQUID STORAGE TANK
James H. Farrell, Arlington, James Peter Hunsaker, Milton, and George Y. Robinson, Jr., West Acton, Mass., assignors, by mesne assignments, to Conch International Methane Limited, a corporation of the Bahamas
Filed Apr. 22, 1959, Ser. No. 808,068
10 Claims. (Cl. 220—71)

This invention relates to the storage and transportation of a liquid in tanks or containers of large capacity and relates more particularly to a tank or container for use in transportation of the liquid over water, as in a ship, barge or the like.

In the use of a ship as a transportation means, it is most expedient, from a commercial standpoint, to make maximum utilization of the cargo space available in the ship for the installation of tanks for housing the liquid to be carried from a source of supply to a distant station for use. Maximum utilization of available space can, of course, be achieved by utilizing the ship's hull as a container, as in tanker construction, for the transportation of liquid petroleum products. This is not possible, however, in the transportation of a liquid which needs to be maintained at extremely low temperature because the ship's steel loses ductibility and strength at the temperature of the cold liquid such that destruction of the ship would become possible. Further, the steel hull of the ship would merely serve as a good heat transfer medium through which heat would flow rapidly from the sea to the liquid to cause substantially all of the liquid to boil off with resultant loss of cargo.

Thus it becomes desirable to make use of storage tanks for the liquid and to arrange the tanks within the ship's hold in a manner to minimize transmission of cold from the liquid to the structural elements of the ship and in a manner to minimize the transmission of heat to the liquid to cause corresponding vaporization thereof. For this purpose, spaces between the tanks and the ship's hull or hold are adapted to be insulated as by means of insulation applied to the outer surfaces of the tanks or applied adjacent the walls of the ship or else by the use of a thermos-type tank construction.

With reference to the problem of maximizing the utilization of space available in a ship, it is expedient to make use of a tank of rectangular or polygonal shape in cross-section. The selection of tanks of rectangular or polygonal shape for maximum utilization of available storage space is, however, confronted with problems of the type not encountered in tanks of spherical or cylindrical shape. While the latter are less efficient from the standpoint of space utilization in the ship, they are capable of distribution of load such that strain placed upon one wall is substantially completely and immediately distributed throughout the entire wall of the tank. Such complete and uniform load equalization is not available on tanks of polygonal shapes such that it becomes desirable to embody means in the design of such tanks of rectangular or polygonal shape for enhancing the strength and rigidity in the tank without relying solely upon the increase in wall thickness or upon the use of exceptionally expensive high-strength metal in the construction of the tank walls. The walls of a tank are subject to such non-uniform applications of load in response to the surge in the liquid load which takes place as the ship rolls or pitches during navigation through the water.

It is an object of this invention to produce a tank of large capacity for the storage of liquid and it is a related object to produce a liquid storage tank of the type described which is of rectangular or polygonal shape in cross-section; which is capable of distribution of load in use thereby to minimize the stresses or strains placed upon any one wall in response to a shift or surge in the liquid load; which is adapted for the storage of liquid having a temperature which differs widely from ambient temperature and which, notwithstanding such temperature change, is relatively free of stresses induced by differences in temperature through the vertical dimension of the tank; which is constructed of relatively few simple parts which are capable easily and efficiently to be assembled into a structurally strong container and which permits maximum utilization to be made of the space available in the ship for storage and transportation purpose.

These and other objects and advantages of this invention will hereinafter appear and, for purposes of illustration, but not of limitation, embodiments of the invention are shown in the accompanying drawings, in which—

Figure 1:
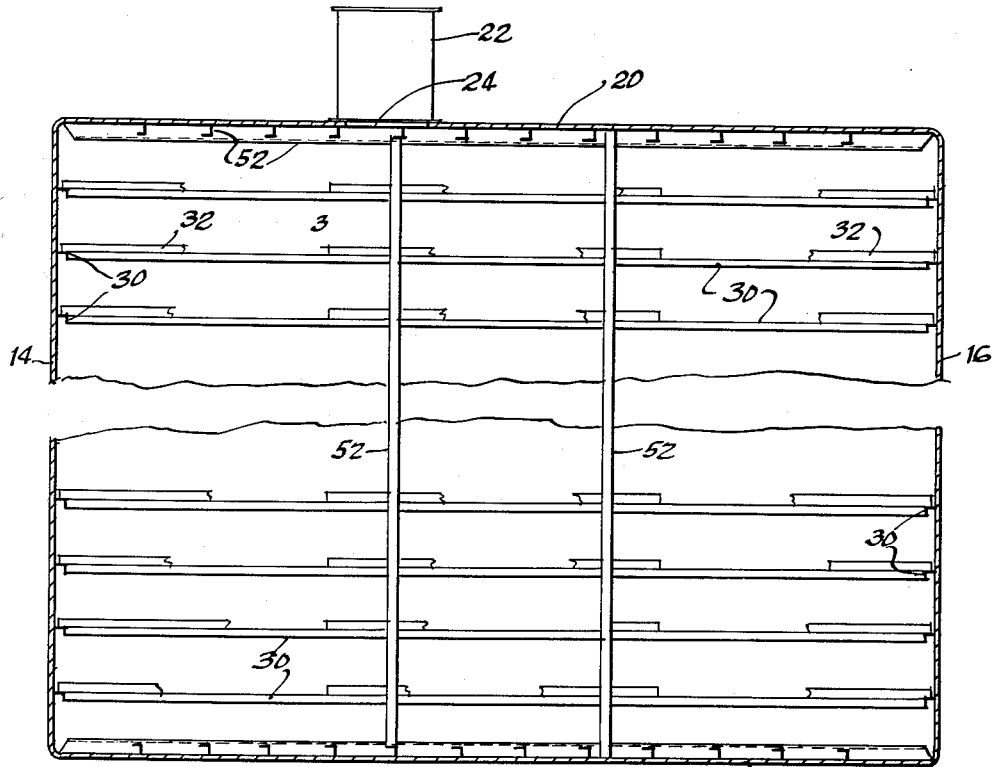
FIGURE 1 is a schematic sectional elevational view taken along the lines 1—1 of FIGURE 2.

In the copending application Serial No. 634,547, filed January 16, 1957, a description is made of a tank of rectangular shape for housing large volumes of a liquefied gas for ship transportation from a source of plentiful gas supply to an area where a deficiency of the gas exists and in which the area is separated by water to militate against the efficient transmission of the gas by pipeline. The tanks of the aforementioned copending application are fabricated of a metal capable of retaining strength under the conditions of use. For purposes of reinforcement and stiffening, the walls of the tank are provided with beams in the form of angle irons. The reinforcing and stiffening beams are horizontally disposed in vertically spaced apart relation so that the entire beam section will be at a uniform temperature to avoid the development of stresses and strains which would otherwise naturally develop in the walls and beams when the beams extend vertically in a direction in which a wide temperature differential may exist within the tank. For example, in the transportation of a liquefied natural gas at atmospheric pressure, the portion of the beams and wall submerged below the level of the liquid in the tank will be at or about —258° F. whereas increasing temperature will exist in the vapor space above the liquid. Thus when the beams are horizontally disposed in vertically spaced apart parallel relation with the tank, temperature differentials are avoided in the beam sections at various levels thereby to eliminate differentials in expansion and contraction which might otherwise occur through the length of a vertical beam to cause distortion thereof.

The tank of the copending application is also provided with horizontally disposed cross tie members extending angularly between adjacent walls. In the preferred practice, the cross tie members are secured at their end sections to the horizontally disposed, vertically spaced apart beams. In operation, such cross tie members are intended to interconnect the beams with rigid arms which operate in tension to resist deformation of the tank walls and to transmit load from one wall to adjacent walls thereby to distribute the load applied to one wall of the tank in response to the surge or movement of the liquid.

Additional factors embodied to distribute load comprise horizontally disposed, vertically spaced apart cross brace members extending crosswise between the mid-sections of opposite walls. Such cross brace members operate not only to maintain a predetermined spaced relationship between the walls thereby to transmit load crosswise between opposite walls of the tank but such fixed relative positions operate to provide pivotal points about which deflections in the respective walls are limited thereby to provide a combination of factors which are effective to distribute load and resist excessive deformation.

This invention is addressed to a tank embodying the features of tanks described and claimed in the aforementioned copending application but which includes additional elements whereby a tank of greater strength and stability is secured even without the necessity of making use of such cross brace and/or cross tie members. The concepts of this invention are concerned with a similar tank of rectangular or polygonal shape and preferably wherein one of the pairs of opposite side walls may be of substantially greater dimension by comparison with others thereby to be subject to greater deformation under load.

In accordance with the practice of this invention, instead of, or in addition to, the cross-tie between central sections of opposite walls of the tank by horizontally disposed, vertically spaced apart cross brace members, the individual walls of the tank are interconnected at their mid-sections to opposite corner sections of the tank, as by horizontally disposed, vertically spaced apart tie-in members. Such tie-in members can extend continuously from the mid-sections of one wall to the opposite corners of the tank or, in the alternative, such tie-in members may extend from the mid-portions of one wall to a common point from which struts extend to opposite corner sections thereby to provide a stabilization point in an interior portion of the tank which ties in the mid-sections of the wall directly to opposite corner sections. This concept is capable of various modifications, as will hereinafter be described, but it will be understood that the described bracing and tie in members will be horizontally disposed in vertically spaced apart relationship to avoid the difficulties arising in conventional tank construction using vertically disposed elements interconnected with horizontally disposed members for reinforcement.

Referring now to FIGURE 1 of the drawing, illustration is made of a tank embodying the features of this invention wherein the tank is of rectangular shape and is formed with side walls 10 and 12 of greater crosswise dimension than the end walls 14 and 16. The tank housing is completed by a bottom wall 18 and a top wall 20 having a trunk 22 extending upwardly from the top wall in communication with a suitable opening 24 through the top wall for the passage of loading and unloading pipes, vapor vents, control members and the like, all of which are omitted from the drawings for purposes of better illustration of the construction embodying the features of this invention.

The construction embodying the features of this invention is embodied in the elements used to rienforce the vertical walls 10 to 16 of the tank. Such reinforcing elements are horizontally disposed and repeated in closely spaced apart levels throughout the height of the tank. Since the reinforcing elements at each level correspond to the reinforcing elements at other levels, it will be sufficient for the purposes of this application to describe the concepts of the invention with reference to the construction of the reinforcing elements at any one level, it being understood that a similar construction appears in vertically spaced portions of the tank.

A plurality of horizontally disposed, reinforcing and stiffening members 30 are secured, as by welding, in vertically spaced apart parallel relation to the inner faces of the vertically disposed tank walls. The reinforcing or stiffening members 30, in the form of metal plates, angle irons, I-beams, H-beams or the like, extend substantially continuously about the inner surface of the tank to reinforce and stiffen the walls at vertically spaced apart levels. They operate to tie in the walls one with another in a manner to resist deformation under load and to distribute load to adjacent walls of the tank. Because of the horizontal relationship of the reinforcing and stiffening members 30, as distinguished from the vertical arrangement of beams as heretofore employed, temperature gradients between various levels of the tank will have little, if any, effect on the stress relationships which would otherwise become developed in the tank. As a result, a tank having its vertical walls reinforced with such horizontally disposed, reinforcing and stiffening members, will be free to expand and contract without the introduction of stresses or strains from vertically supporting or reinforcing elements.

The cross ties 32, which span the area between adjacent walls and sections of the reinforcing and stiffening members 30, comprise elongate metal or other rigid, structurally strong elements which are preferably spaced one from the other inwardly from the corner between the walls. When more than one cross tie member is provided for each corner section, it is desirable to maintain a uniform spaced relationship therebetween and it is preferred to limit the distance from the corner so as not to bring the ends of the cross tie members 32 beyond the centers of the adjacent walls thereby to avoid crossing over and interfering with the cross tie members or tie-in members, which will hereinafter be described. Thus, in a rectangularly shaped tank, as illustrated in the drawings, a section of the center of the tank wall will remain free of cross ties, as illustrated in each of the drawings.

In accordance with the practice of this invention, the mid-sections of the walls are connected to the opposite corners of the tank, as by means of tie-in members 34 in the form of struts. In the construction described in the aforementioned copending application, the mid-sections of one wall were interconnected with the mid-sections of the wall opposite thereto, as by means of cross brace members. Some interconnection between mid-sections still permits a deflection wherein the deformation of one wall was transmitted to the other through the cross brace members. Tie in of the central sections of the wall with the opposite corner of the tank minimizes the deflective characteristics of the previous construction by reason of the fact that the corner sections constitute stiff sections which effectively resist deformation. As a result, deflection of the walls in response to shifting load is effectively resisted by the struts 34 which operate to transmit the load from the wall to the opposite corner sections for distribution and which tie in the wall to minimize deformation. With such resistance to deformation at the point of contact between the struts with the mid-sections of the walls, such contact points become even more effective as pivotal points about which deflection must take place thereby to provide increased resistance to deformation, as described in the copending application. It will be understood that such tie in construction between the walls and the opposite corner by horizontally disposed struts can be used in the absence of or in combination with horizontally disposed cross brace members 36 of the type previously described for distribution of load between opposite walls.

Figure 2:
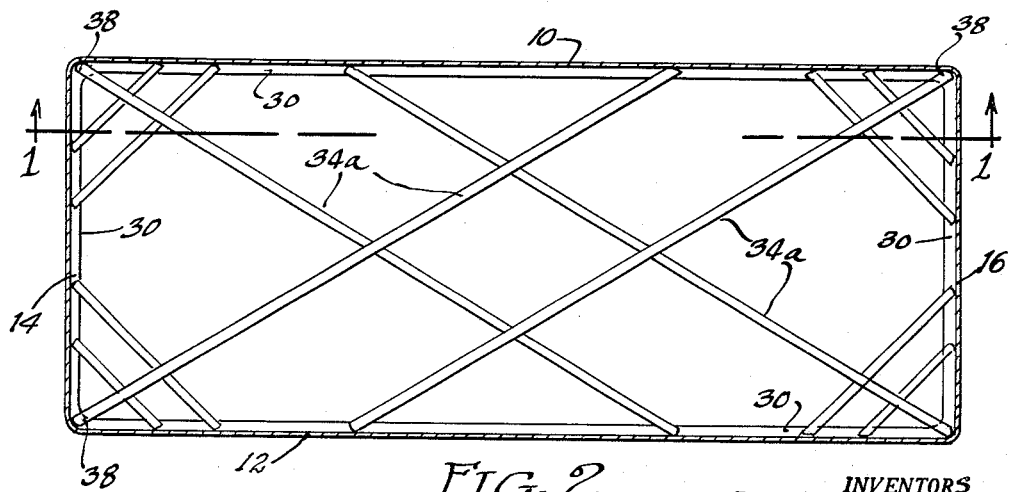
FIGURE 2 is a sectional view horizontally across the mid portion of the tank shown in FIGURE 1 showing one modification in the construction and arrangement of the strengthening, stiffening and reinforcing elements of the tank.

As previously pointed out, the concepts described are capable of various applications. In FIGURE 2, the struts 34A extend from a mid-section of a wall offset from the center to the opposite corner 38 of the tank such that each wall is provided with at least one pair of struts which cross over at about the crosswise center line of the tank for attachment to the opposite corner sections. In the modification of FIGURE 2, the tank is formed to considerably greater length than width such that it is sufficient to have the struts extend from the side walls 14 and 16 to the opposite corner sections.

Figure 3:
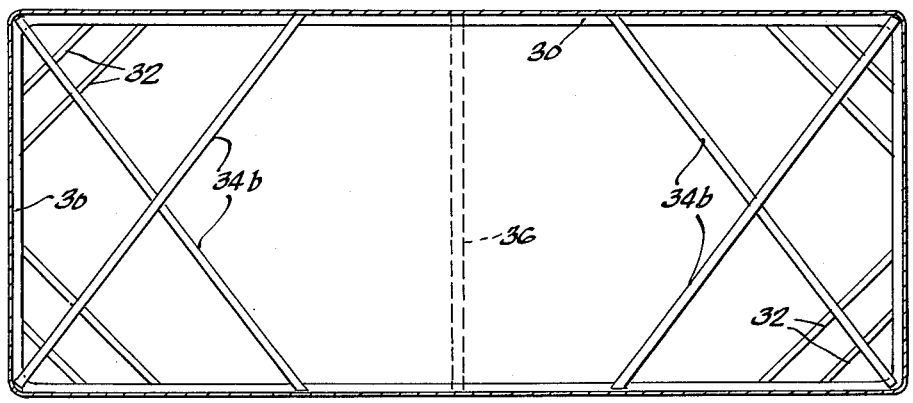
FIGURE 3 is a sectional view similar to that of FIGURE 2 showing a modification in the tank construction.

In the modification of FIGURE 3, the struts 34B extend from laterally spaced apart portion of the mid-sections of the wall to the opposite corner sections of the tank but, instead of crossing over to the far corner sections, each strut extends angularly to the near opposite corner sections so that the struts extending from one wall do not cross over.

Figure 4:
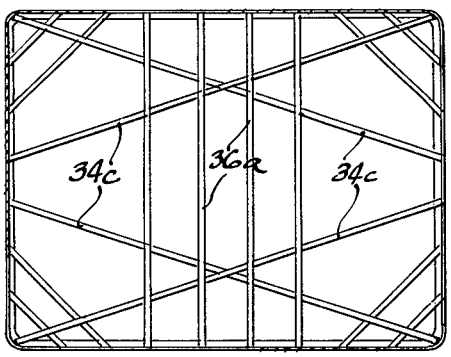
FIGURE 4 is a further sectional view similar to that of FIGURES 2 and 3 showing a still further modification in the construction of the tank.

In the modification illustrated in FIGURE 4, the struts 34C extend from the mid-sections of the narrow walls to the opposite corners of the tank. In this modification, use is made of cross brace members 36A extending crosswise in laterally spaced apart relation from the mid-sections of the wider walls to interconnect the mid-sections.

Figure 5:
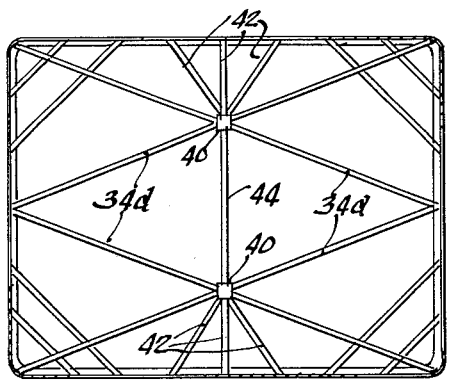
FIGURE 5 is a sectional view similar to that of FIGURES, 2, 3, and 4 showing still further modifications in the tank construction.

In the modification of FIGURE 5, the tie in members 34D extend from the mid-sections of the opposite walls to the opposite corners of the tank. In this construction, the struts extending from the mid-sections of the walls to the opposite corner sections cross over one another along the center line of the tank. The struts are interconnected at such cross-over points 40. Other struts 42 extend from laterally spaced apart portions of the mid-sections of the wall therebetween to the adjacent cross-over points for interconnection therewith and the cross-over points are interconnected by a central strut 44. The latter extends from the tie in points to the center of the in-between walls to provide the effect of cross brace members between the opposite walls.

Figure 6:
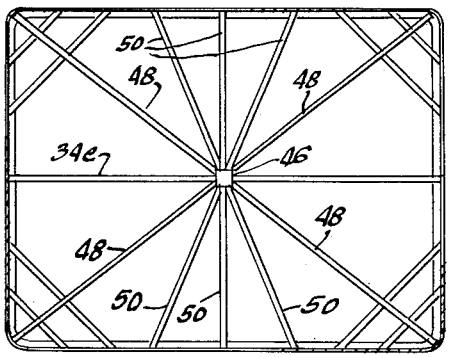
FIGURE 6 is a sectional view similar to that of FIGURES 2 to 5 showing a still further modification.

In the modification illustrated in FIGURE 6, all of the struts 34E are joined at their inner ends to a central plate 46 aligned with the central vertical axis of the tank. One group of struts 48 extend diagonally from the center plate to each of the corner sections of the tank. Others of the struts 50 radiate from the center tie in plate to the mid-sections of each of the walls. Where, as in FIGURE 6, one pair of walls are of greater dimension than the other, more than one strut may radiate outwardly from the center plate to laterally spaced apart portions of the mid-sections of such walls.

It will be apparent from the description that the combination of the horizontal bracing members, cross tie members and tie-in members (with or without the cross brace members) provides a tank of increased strength and stability capable of resisting the surge of liquid load against any wall of the tank while, at the same time, remaining substantially indifferent to the temperature gradients that may exist in various levels of the tank. From the theoretical standpoint, a new and novel combination of load transmitting and reinforcing members is provided for minimizing the effect of unusual loads or stresses applied against any one or more walls of the tank.

When load sufficient to cause deformation develops by surge of the liquid in the tank, the force relationship developed through the described members are believed effective to distribute the load to adjacent walls. Deformation, if any occurs, can occur about the points of attachment of the struts to the mid-sections of the walls whereby such deflections are resisted, as pointed out in the previous copending application. The combination of forces distributed by the tie-in members coupled with the stiffening and reinforcing available from the plurality of the horizontally arranged stiffening and reinforcing members is effective to stabilize the tank structure of maximum capacity and strength with minimum wall thickness and therefore with minimum expenditure from the standpoint of materials and cost.

While the foregoing defines the important concepts embodied in the tank for strength and stability under load, the following will describe other elements illustrated in the tank of the drawings. The top wall is provided with additional stiffening and reinforcing members such as beams 52 secured to the underside to extend lengthwise and crosswise thereof in spaced apart relation. The numeral 52 illustrates vertical members which, if desired, may be incorporated to interconnect the top wall with the bottom wall of the tank.

The design of the horizontal bracing members, cross tie and tie-in members may be calculated on the basis of stress analysis to provide adequate strength to support and transmit load. For example, in a tank which is 30' x 30' x 50' formed of aluminum having a thickness of ½", it has been found desirable to space the horizontal bracing members between 20 to 30" apart using bracing members of 5" x 3" x ⅜" angles. It has been found that an aluminum alloy (particularly an aluminum-magnesium-chromimum-manganese alloy) is particularly suited for use in the construction of the plates and the horizontal bracing and reinforcing members embodied in the practice of this invention. The aluminum-magnesium alloy tends to gain strength and ductility at low temperature and thus not subject to loss of strength and ductility at the temperature conditions existing when loaded with a liquefied gas. Instead, nickel-bearing steels, aluminum or stainless steel might also be employed. It will be understood that other metals of high structural strength capable of maintaining ductility under the temperature conditions existing might also be used for the construction of the walls of the tank and the various reinforcing and strengthening elements therein.

The structural arrangement described will enable the tank to behave as a stiff box that is fully capable of self-sufficiency under load with a minimum amount of material. The tank will also be capable of operating with large unbalanced pressures as might be caused by the surge of liquid within the tank.

It will be understood that changes may be made in the detail of construction, arrangement and operation without departing from the spirit of the invention, especially as defined in the following claims.

We claim:

1. A large container of polygonal shape for use in the storage and transportation of a large volume of liquid differing widely from the ambient temperature and directly in contact with the surfaces thereof whereby the walls of the tank are subject to dimensional change due to expansion and contraction and subject to surges against the walls of the container during movement in transportation comprising a completely enclosed tank having a bottom wall, a top wall and vertically disposed walls in between forming a section of polygonal shape, a plurality of vertically spaced apart horizontally disposed, structurally strong, stiffening and reinforcing sections each of which comprises the combination of horizontally disposed stiffening and reinforcing members positioned within the tank adjacent the inner surfaces of the vertically disposed walls to extend substantially continuously thereabout with the outer edges of said members being joined to the inner surfaces of the vertically disposed walls, horizontally disposed cross tie members extending crosswise angularly between said horizontally disposed members on adjacent walls in spaced relationship with the corners therebetween, and horizontally disposed tie-in members extending crosswise from said horizontally disposed members between the mid-sections of a wall to a corner bounded by one side of the opposite wall of the tank.

2. A container as claimed in claim 1 in which at least one cross tie member is provided in each corner to transmit load from one wall to the wall adjacent thereto.

3. A container as claimed in claim 1 in which more than one cross tie member is provided in each corner with the cross tie members spaced one from the other inwardly from the corner for a distance less than that which positions the ends of the cross tie members beyond the centers of the adjacent wall sections.

4. A container as claimed in claim 1 in which more than one tie-in member extends from the mid-sections of one wall to different corners bounded on one side by the opposite wall of the container.

5. A container as claimed in claim 1 in which the tie-in members extend from laterally spaced apart portions of the mid-sections of one wall to the corners of the tank on the same side of the mid-section whereby the tie-in members extend from the mid-sections of one wall in the direction away from each other.

6. A container as claimed in claim 1 wherein the tie-in members extend from laterally spaced apart portions of the mid-sections of one wall to the corners on the opposite side of the center of the wall whereby the tie-in members extend in the direction towards each other to cross each other before engagement with their respective corners.

7. A container as claimed in claim 6 in which the tie-in members are joined one to the other at their cross-over points.

8. A container as claimed in claim 7 which includes cross brace members extending from said cross-over points to the mid-sections of opposite walls to cross-tie the walls of the tank.

9. A container as claimed in claim 1 in which the tie-in members are interconnected one with the others by a central plate having elements extending from the plate to the mid-sections of the walls and from the plate to the corners of the tank to tie in the mid-sections with the corners of each of the connected walls.

10. A large container of polygonal shape for use in the storage and transportation of a large volume of liquid which is subject to surges against the walls of the container during movement in transportation comprising a tank having a bottom wall, a top wall and vertically disposed walls in between forming a section of polygonal shape, a plurality of vertically spaced apart horizontally disposed stiffening and reinforcing sections each of which comprises horizontally disposed stiffening and reinforcing members positioned within the tank adjacent the inner surfaces of the vertically disposed walls to extend substantially continuously thereabout with the outer edges being joined to the inner surfaces of the vertically disposed walls, horizontally disposed cross tie members extending crosswise angularly between adjacent walls in spaced relationship with the corners therebetween, horizontally disposed tie-in members extending crosswise between the mid-sections of a wall to a corner bounded on one side by the opposite wall of the tank, and horizontally disposed cross brace members extending crosswise from the mid-sections of one wall to the mid-sections of the opposite wall.

References Cited in the file of this patent

UNITED STATES PATENTS

| | | |
|---|---|---|
| 1,674,918 | Pew | June 26, 1928 |
| 1,757,923 | Russell | May 6, 1930 |
| 2,296,414 | Albrecht | Sept. 22, 1942 |
| 2,346,436 | Krause | Apr. 11, 1944 |
| 2,533,041 | Plummer | Dec. 5, 1950 |
| 2,563,470 | Kane | Aug. 7, 1951 |

FOREIGN PATENTS

| | | |
|---|---|---|
| 155,906 | Australia | Aug. 13, 1953 |
| 159,025 | Australia | Apr. 15, 1954 |
| 180,695 | Austria | June 15, 1954 |